United States Patent Office 3,418,151
Patented Dec. 24, 1968

3,418,151
TREATED SOIL ADJUVANT PLANT-
GROWING PRODUCT
Joseph V. Otrhalek, Dearborn, and Robert E. Gansser,
Wyandotte, Mich., assignors to Wyandotte Chemicals
Corporation, Wyandotte, Mich., a corporation of
Michigan
No Drawing. Filed Nov. 26, 1965, Ser. No. 510,084
3 Claims. (Cl. 117—62.1)

ABSTRACT OF THE DISCLOSURE

A solid product suitable for use in growing plants consisting essentially of about 60 to 99.5 weight percent of (A) porous angular particles of a solid mineral product having a pore size ranging from about 4 to 35 angstroms, a particle size ranging from about 5 to 80 mesh, and which weighs about 20 to 60 pounds per cubic foot, consisting essentially of about 40 to 80 weight percent silica as $SiO_2$, about 2 to 30 weight percent alumina as $Al_2O_3$, about 0.5 to 15 weight percent of iron as $Fe_2O_3$, about 0.5 to 10 weight percent of lime as CaO, and about 0.5 to 10 weight percent magnesium as MgO, impregnated with about 0.5 to 40 weight percent of (B) material selected from the group consisting of alkyl polysiloxanes, aryl polysiloxanes and metal salts of organic acids having about 8 to 24 carbon atoms in the molecule.

---

This invention relates to a product suitable for use in growing plants and to a method of producing such product.

Satisfactory plant growth is largely influenced by the proper balance of air, water, sunshine and nutritional elements in the soil and an important factor is the condition of the soil. A hard, closely packed soil not only resists the penetration of plant roots but also limits aeration and impedes the passage of water, carrying nutritional elements or other substances through the soil. Thus, it has been found that a loosely packed soil is more favorable to plant growth than a hard packed soil and a number of products have been developed which tend to maintain the soil in the more loose or pliable condition. Such products, which are not nutritional elements per se, may be termed adjuvants to plant growth. As such adjuvants various materials and minerals such as bentonite, glauconite, vermiculite and illite have been employed.

An excellent adjuvant, which is superior to those mentioned above in many respects, is a solid product which consists essentially of porous angular particles of a solid mineral product having a pore size ranging from about 4 to 35 angstroms, a particle size ranging from about 5 to 80 mesh, and which weighs about 20 to 60 pounds per cubic foot consisting essentially of about 40 to 80 weight percent silica as $SiO_2$, about 2 to 30 weight percent alumina as $Al_2O_3$, about 0.5 to 15 weight percent iron as $Fe_2O_3$, about 0.5 to 10 weight percent of lime as CaO, and about 0.5 to 10 weight percent magnesium as MgO.

While the above product is generally an excellent and, in fact, superior soil amendment or adjuvant product in areas having medium to high humidity, the product possesses certain disadvantages where used in dry, arid areas having long periods of very low humidity. For example, in typical reclaimed land areas where water is supplied by irrigation, the above product tends to increase the need for irrigation since the particles draw the moisture from the soil and expose it to evaporation on the larger, better aerated particles of the adjuvant or soil amendment product.

Accordingly, it is a purpose of this invention to provide a solid product which serves as an excellent soil adjuvant of the type described above and which, in addition, does not have the disadvantage of drawing moisture from the soil and exposing it to evaporation on the larger, better aerated particles of the adjuvant.

Applicant has determined that the above purpose and others may be achieved by impregnating the above described adjuvant with a material selected from the group consisting of alkyl or aryl polysiloxanes and salts of organic acids having from 8 to 24 carbon atoms in the molecule.

Thus, the purposes of this invention may be achieved with a solid product which consists essentially of about 60 to 99.5 weight percent of (A) porous angular particles of a solid mineral product having a pore size ranging from about 4 to 35 angstroms, a particle size ranging from about 5 to 80 mesh, and which weighs about 20 to 60 pounds per cubic foot, consisting essentially of about 40 to 80 weight percent silica as $SiO_2$, about 2 to 30 weight percent alumina as $Al_2O_3$, about 0.5 to 15 weight percent iron as $Fe_2O_3$, about 0.5 to 10 weight percent of lime as CaO, and about 0.5 to 10 weight percent magnesium as MgO, impregnated with about 0.5 to 40 weight percent of (B) material selected from the group consisting of alkyl polysiloxanes, aryl polysiloxanes and salts of organic acids having about 8 to 24 carbon atoms in the molecule.

The mineral product (A) may also contain trace amounts of other materials such as phosphorus, potassium, manganese and copper as can be determined by spectrographic analysis, and about 0.5 to 10 weight percent matter which is volatile at about 1110° F. The material for this product is generally obtained from clay-like deposits directly from the ground which are crushed and calcined at a temperature sufficient to drive off free water and molecular water but at a temperature which is below the disintegration point. It is known in the prior art that with such materials the free water and molecular water may be driven off at a temperature of about 900° F. and that disintegration takes place completely at a temperature of about 1600° F. Thus, to avoid the possibility of disintegration, it is preferred to calcine at a maximum temperature of about 1400° F.

The particles of mineral (A) are impregnated with the material (B) by spraying the particles of the mineral product (A) with a liquid containing material selected from the group consisting of alkyl or aryl polysiloxanes and organic acids or salts of organic acids having from about 8 to 24 carbon atoms in the molecule. Where material (B) is a salt of an organic acid having from 8 to 24 carbon atoms in the molecule, it is preferred to, first, spray the material (A) with a liquid containing one or more organic acids having from 8 to 24 carbon atoms in the molecule, followed by spraying with a basic neutralizing solution. A preferred process comprises tumbling the mineral product particles (A) on a continuously moving surface such as that provided by the inside surface of a rotory drum-type apparatus similar to a rotary dryer or a rotating inclined pan and spraying the tumbling particles with the liquid. The spraying is continued for a sufficient time to assure even distribution and to provide a material containing the desired percentages of the mineral product (A) and the material (B). The pores of the mineral product (A) either absorb or adsorb the components of the material (B).

Suitable alkyl or aryl polysiloxanes for the purposes of this invention include dimethyl polysiloxane, diethyl polysiloxane, dipropyl polysiloxane, dibutyl polysiloxane, diamyl polysiloxane, dihexyl polysiloxane, monomethyl polysiloxane, monoethyl polysiloxane, monopropyl polysiloxane, monobutyl polysiloxane, monoamyl polysiloxane, monohexyl polysiloxane and higher alkyl polysiloxanes having up to 10 carbon atoms in the alkyl group and phenyl polysiloxanes and alkyl phenyl polysiloxanes having up to 10 carbon atoms in the alkyl group. In order to provide a suitable spraying liquid, the polysiloxane material is supplied in an aqueous emulsion containing from about 5 to 60 weight percent alkyl polysiloxane. In addition, the liquid may also contain well-known emulsifiers such as from about 1 to 50 weight percent total of silica, stearate and alginate emulsifiers, and other useful additives such as from about 1 to 20 weight percent total of sorbic and benzoic acids. In spraying with a liquid containing about 5 to 60 weight percent alkyl polysiloxane in water, a weight ratio from about 3/1000 to 1/2 alkyl polysiloxane emulsion to mineral particles is preferred. This results in a final product containing from about 1 to 40 weight percent polysiloxane.

Where the organic acid salts are employed for treating the mineral particles, salts of the following acids are preferred: butyric, caproic, caprylic, capric, lauric, lauroleic, myristic, myristoleic, pentadecanoic, palmitic, palmitoleic, margaric, stearic, oleic, linoleic, linolenic, ricinoleic, dihydroxystearic, licanic, elaeostearic, arachidic, eicosenoic, eicosapolyenoic, behenic, docosenoic, docosapolyenoic, lignoceric, tetracosenoic, and tetracosapolyenoic.

These acids which are either in liquid form or provided in liquids containing them, e.g., emulsions, solutions, etc., are sprayed onto the mineral particles followed by spraying with a basic neutralizing solution. A single acid or a plurality of the acids may be contained in the spraying liquid. Natural liquids or oils containing these acids may be employed such as, for example, tall oil which contains 1.0 percent palmitic acid, 0.5 percent palmitoleic acid, 1.5 percent stearic acid, 50.5 percent oleic acid, and 46.5 percent linoleic acid. Other naturally occurring oils which may be employed are neatsfoot oil which contains in percent by weight 0.5 lauroleic, 1.0 myristic, 0.5 myristoleic, 20.5 palmitic, 6.0 palmitoleic, 4.5 stearic, 56.5 oleic, 9.5 linoleic, 0.5 total arachidic and eicosenoic, and 0.5 total docosenoic and docosapolyenoic acids; oiticica oil which contains in percent by weight 6.0 palmitic, 5.0 stearic, 6.0 oleic, 5.0 linoleic, 2.0 total ricinoleic and dihydroxy stearic, and 76.0 licanic acids; safflower oil containing in weight percent 8.0 palmitic, 3.0 stearic, 13.5 oleic, 75.0 linoleic and 0.5 linolenic acids; olive oil containing in percent by weight 13.0 palmitic, 1.0 palmitoleic, 2.5 stearic, 74.0 oleic, 9.0 linoleic, and 0.5 linolenic acids. Other natural oils which may be used are castor, cocoa butter, coconut, corn, cottonseed, linseed, mustard seed, palm, peanut, rapeseed, sesame, sunflower, tung and whale. After spraying with the organic acid or mixture of organic acids, the material is then sprayed with an aqueous solution or suspension of a hydroxide, carbonate, or oxide of a metal, preferably calcium, magnesium, zinc, iron, and aluminum or mixtures thereof in an amount sufficient to neutralize the acid.

The following examples illustrate the practice of this invention.

EXAMPLE I 80 parts by weight of porous angular particles of a solid mineral product, sold under the trademark TURFACE, are tumbled in a 1-foot diameter, 0.5-foot deep inclined pan similar to that illustrated in FIGURE 5, page 92, of Chemical Engineering for Feb. 5, 1962. The axis of the shaft on which the pan is mounted is tilted at an angle of 30° to the horizontal. The pan is rotated at 60 r.p.m. by means of a conventional electric motor and drive means driving the shaft.

The solid mineral product has a particle size ranging from about 10 to 40 mesh, a pore size ranging from about 4 to 35 angstroms, weighs about 38 pounds per cubic foot and consists essentially of 69.9 weight percent silica as $SiO_2$, 14.5 weight percent alumina as $Al_2O_3$, 5.4 weight percent of iron as $Fe_2O_3$, 0.9 weight percent lime as CaO, 0.9 weight percent magnesium as MgO, and small amounts of phosphorus, potassium, manganese, and copper as shown by spectrographic analysis and 1.0 weight percent of matter which is volatile at 1110° F.

A water emulsion containing 10 weight percent dimethyl polysiloxane, 5 weight percent silica, stearate and alginate emulsifiers, and 2 weight percent sorbic and benzoic acids, balance water is sprayed onto the mineral particles tumbling in the inclined pan for a period of 5 minutes. To prepare the ultimate product, 80 percent of the mineral product is employed with 20 percent of the emulsion, thereby providing a product containing 2 percent dimethyl polysiloxane, balance mineral product.

Two glass columns, 1¼ inches in diameter, provided with a screen at the bottom are filled with the untreated porous mineral product described above and with the above-described treated product, respectively. The tubes were placed in water to a depth of about ¼ inch with about 8 inches of the particulate material above the water level. The untreated material begins drawing water immediately and rapidly while the treated material indicates no drawing action whatsoever.

EXAMPLE II

A treated mineral product similar to that of Example I is prepared by the method of Example I with the exception that monoethyl polysiloxane is substituted for the dimethyl polysiloxane.

EXAMPLE III

A treated mineral product similar to Example I is prepared by the method of Example I with the exception that dihexyl polysiloxane is substituted for the dimethyl polysiloxane of Example I.

EXAMPLE IV

A treated mineral product similar to Example I is prepared by the method of Example I with the exception that phenyl polysiloxane is substituted for the dimethyl polysiloxane of Example I.

EXAMPLE V

A treated mineral product similar to that of Example I is prepared by the method of Example I with the exception that in lieu of the inclined pan the porous mineral particles are tumbled inside an 8-inch diameter rotating drum, 12 inches long, rotated at 60 r.p.m. by an electric motor through a conventional drive mechanism.

EXAMPLE VI 94 parts by weight of the porous angular particles of the solid mineral product described in Example I are tumbled in an inclined pan, also as described in Example I, and sprayed with 5 parts by weight of tall oil fatty acid over a period of 5 minutes. This spraying operation is followed by spraying over a period of 5 minutes with 5 parts by weight of a lime solution prepared by combining 20 percent $Ca(OH)_2$ with 80 percent water.

This material when subjected to the column immersion test described in Example I is found to be equal or superior to even that of Example I, since with the instant product even the ¼-inch portion that was immersed in the water is not wetted for a substantial period of time.

EXAMPLE VII

A product similar to Example VI is produced by the method of Example VI with the exception that the proportions are different, i.e., 97 parts by weight of the mineral product, 2.5 parts by weight of the tall oil fatty acid and 5 parts by weight of a 10 percent aqueous solution of $Ca(OH)_2$, all other conditions remaining the

EXAMPLE VIII

A product is produced by the process described in Example VI with the exception that refined tall oil is employed in lieu of tall oil fatty acid and the proportions are different, i.e., 200 parts by weight of the mineral product, 4 parts by weight of the refined tall oil and 9 parts by weight of a 10 percent aqueous solution of Ca(OH)$_2$. This product demonstrates good results in the column immersion test since the immersed portion is wet very slowly and rises above the water level exceptionally slowly.

EXAMPLE IX

A product is produced by the method of Example VIII with the exception that crude tall oil is employed in lieu of the refined tall oil and the mineral product is first sprayed with 10 parts by weight of the 10 percent aqueous Ca(OH)$_2$ solution, and then sprayed with the crude tall oil. The product produced when subjected to the column immersion test gives substantially the same results as Example VIII.

EXAMPLE X

A product is produced by the process of Example VI with the exception that magnesium hydroxide is substituted for the calcium hydroxide. The resulting product has better properties for the purposes of this invention than the untreated mineral product.

EXAMPLE XI

A product similar to Example VI is produced by the method of Example VI with the exception that neatsfoot oil is substituted for the tall oil fatty acid.

EXAMPLE XII

A product similar to Example VI is produced by the method of Example VI with the exception that safflower oil is substituted for the tall oil fatty acid.

EXAMPLE XIII

A product similar to Example VI is produced by the method of Example VI with the exception that oiticica oil is substituted for the tall oil fatty acid.

EXAMPLE XIV

A product similar to Example VI is produced by the method of Example VI with the exception that olive oil is substituted for the tall oil fatty acid.

It is to be understood that various changes and modifications may be made in the foregoing without departing from the spirit of the invention and scope of the appended claims.

What is claimed is:

1. A solid product suitable for use in growing plants consisting essentially of about 60 to 99.5 weight percent of
   (A) porous angular particles of a solid mineral product having a pore size ranging from about 4 to 35 angstroms, a particle size ranging from about 5 to 80 mesh, and which weighs about 20 to 60 pounds per cubic foot, consisting essentially of about 40 to 80 weight percent silica as $SiO_2$, about 2 to 30 weight percent alumina as $Al_2O_3$, about 0.5 to 15 weight percent of iron as $Fe_2O_3$, about 0.5 to 10 weight percent of lime as CaO, and about 0.5 to 10 weight percent magnesium as MgO,
impregnated with about 0.5 to 40 weight percent of
   (B) material selected from the group consisting of alkyl polysiloxanes, aryl polysiloxanes and metal salts of organic acids having about 8 to 24 carbon atoms in the molecule.

2. The product of claim 1 wherein said material (B) is dimethyl polysiloxane.

3. The product of claim 1 wherein said material (B) is the reaction product of a tall oil material with calcium hydroxide.

References Cited

UNITED STATES PATENTS

| | | | |
|---|---|---|---|
| 1,928,894 | 10/1933 | Jefferies | 117—100 X |
| 2,563,555 | 8/1951 | Safford | 117—100 X |
| 2,799,973 | 7/1957 | Smith | 47—58 |
| 2,920,042 | 1/1960 | Eastman | 117—100 X |
| 2,923,095 | 2/1960 | Magimel-Pelonnier et al. | 47—58 |
| 2,940,947 | 6/1960 | Welch et al. | 117—100 X |
| 3,347,245 | 10/1967 | Hawkins | 117—100 X |

OTHER REFERENCES

Miller: Highway Research Board Bulletin 108 Soil and Soil-Aggregate Stabilization, published by National Academy of Sciences, National Research Council, Washington, D.C., 1955, pp. 174–175.

WILLIAM D. MARTIN, *Primary Examiner.*

M. R. P. PERRONE, *Assistant Examiner.*

U.S. Cl. X.R.

117—100; 47—58